United States Patent [19]
Eyler

[11] Patent Number: 5,877,693
[45] Date of Patent: Mar. 2, 1999

[54] METHOD AND APPARATUS FOR MEASURING THE LENGTH OF A MULTI-SECTION TELESCOPIC BOOM

[75] Inventor: Francis R. Eyler, Hanover, Pa.

[73] Assignee: Grove U.S. L.L.C., Shady Grove, Pa.

[21] Appl. No.: 84,419

[22] Filed: May 27, 1998

[51] Int. Cl.⁶ .................................................. G08B 21/00
[52] U.S. Cl. ...................... 340/685; 340/686.1; 212/276; 212/278
[58] Field of Search ................................ 340/685, 686.1, 340/539, 673; 212/276, 278, 280; 324/532, 533, 535

[56] References Cited

U.S. PATENT DOCUMENTS

| | | | |
|---|---|---|---|
| Re. 32,366 | 3/1987 | Garber | 340/685 |
| 2,253,975 | 8/1941 | Guanella . | |
| 2,497,913 | 2/1950 | Rines . | |
| 2,527,753 | 10/1950 | McConnell . | |
| 3,490,019 | 1/1970 | Jessen et al. . | |
| 3,641,551 | 2/1972 | Sterner et al. | 340/522 |
| 3,858,728 | 1/1975 | Fathauer | 212/285 |
| 4,039,084 | 8/1977 | Shinohara et al. | 212/278 |
| 4,057,792 | 11/1977 | Pietzsch et al. | 340/685 |
| 4,089,057 | 5/1978 | Eriksson | 702/158 |
| 4,185,280 | 1/1980 | Wilhelm | 340/685 |
| 4,216,868 | 8/1980 | Geppert | 212/278 |
| 4,516,117 | 5/1985 | Couture et al. | 340/685 |
| 4,679,653 | 7/1987 | Pasquarette, Jr. et al. | 182/2.4 |

*Primary Examiner*—Jeffrey A. Hofsass
*Assistant Examiner*—Van T. Trieu

[57] ABSTRACT

The boom length measurement includes a transmitting unit mounted on the fly section of a multi-section telescopic boom, and a receiving unit mounted on the base section of the multi-section telescopic boom. The transmitting unit transmits a first and second signal having first and second transmission speeds, respectively. The second transmission speed is less than the first transmission speed. Based on a difference in transit times of the first and second signals received by the receiving unit, a length determiner determines the length of the multi-section telescopic boom. A display displays the determined length.

19 Claims, 3 Drawing Sheets

METHOD AND APPARATUS FOR MEASURING THE LENGTH OF A MULTI-SECTION TELESCOPIC BOOM

BACKGROUND OF THE INVENTION

1. Field of the Invention

The present invention relates to a method and apparatus for measuring the length of a multi-section telescopic boom.

2. Description of Related Art

Typical booms employed in the crane and aerial work platform industry have multiple sections, and the length of the boom varies with the extension and retraction of these boom sections. Because boom length affects load moment characteristics and other factors involved in lifting a load, the length of the boom is monitored.

One technique for measuring the length of a boom employs a cable and reel system. The reel is mounted to a base section of the boom. The cable is wound on the reel and anchored to a fly section of the boom. A rotary sensor or multi-turn potentiometer attached to the reel measures the length of the boom based on the sensed rotation of the reel. Several other techniques using potentiometers, rotary sensors, and optical rotary sensors are also known.

Unfortunately, boom length measuring techniques such as above-mentioned cable and reel system are very costly, cumbersome, and subject to malfunction (tangling of the cable, breaking of the cable, etc.)

SUMMARY OF THE INVENTION

The boom length measurement apparatus according to the present invention includes a transmitting unit mounted on the fly section of a multi-section telescopic boom, and a receiving unit mounted on the base section of the multi-section telescopic boom. The transmitting unit transmits a first and second signal having first and second transmission speeds, respectively. The second transmission speed is less than the first transmission speed.

Based on the difference in transit times of the first and second signals received by the receiving unit, a length determiner determines the length of the multi-section telescopic boom. A display displays the determined length.

Accordingly, the boom length measurement apparatus according to the present invention eliminates the costly and cumbersome potentiometer or rotary sensor based structures of conventional boom length measuring systems.

Other objects, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
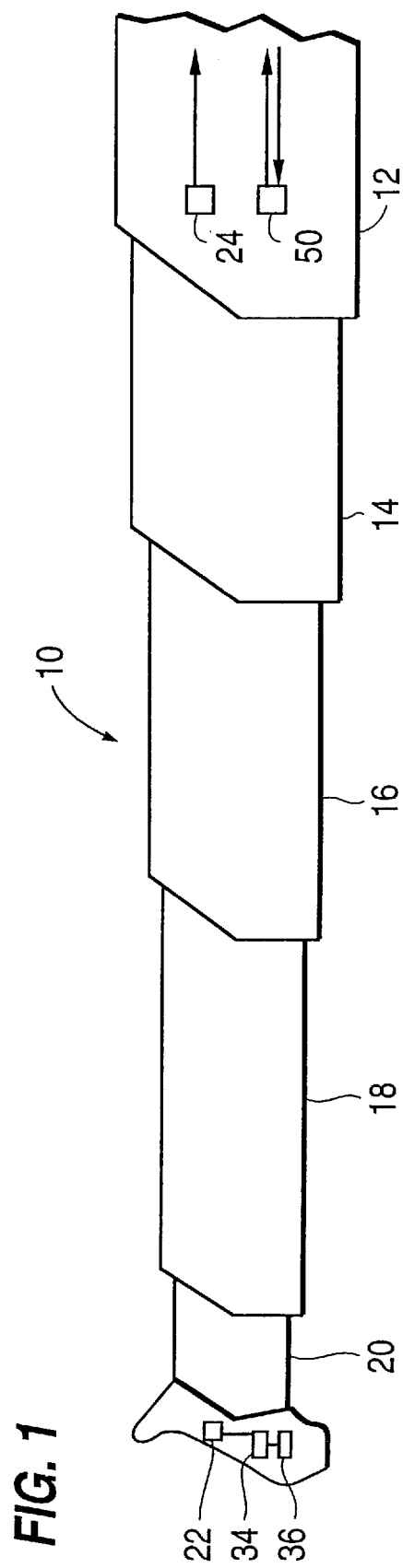
FIG. 1 illustrates a multi-section telescopic boom with a transmitting unit and receiving unit according to the present invention disposed thereon.

Referring to FIG. 1, a multi-section telescopic boom 10 is shown. The multi-section telescopic boom 10 shown in FIG. 1 includes five sections: a base section 12, mounted to a support structure, e.g., the turntable of a crane or aerial work platform, (not shown); an inner mid section 14; a mid section 16; an outer mid section 18; and a fly section 20. A transmitting unit 22, an rf enabled switch 34 and a battery 36, all forming part of an embodiment of the boom length measurement apparatus according to the present invention, are mounted on a boom nose 21 forming the end of the fly section 20. A receiving unit 24 and a boom control enabled transmitter 50, both forming part of the embodiment of the boom length measurement apparatus according to the present invention, are mounted on the base section 12.

It should be understood that the boom length measurement apparatus according to the present invention is not limited in application to a five section telescopic boom, but can be applied to a telescopic boom having any number of telescopic sections.

Figure 2:
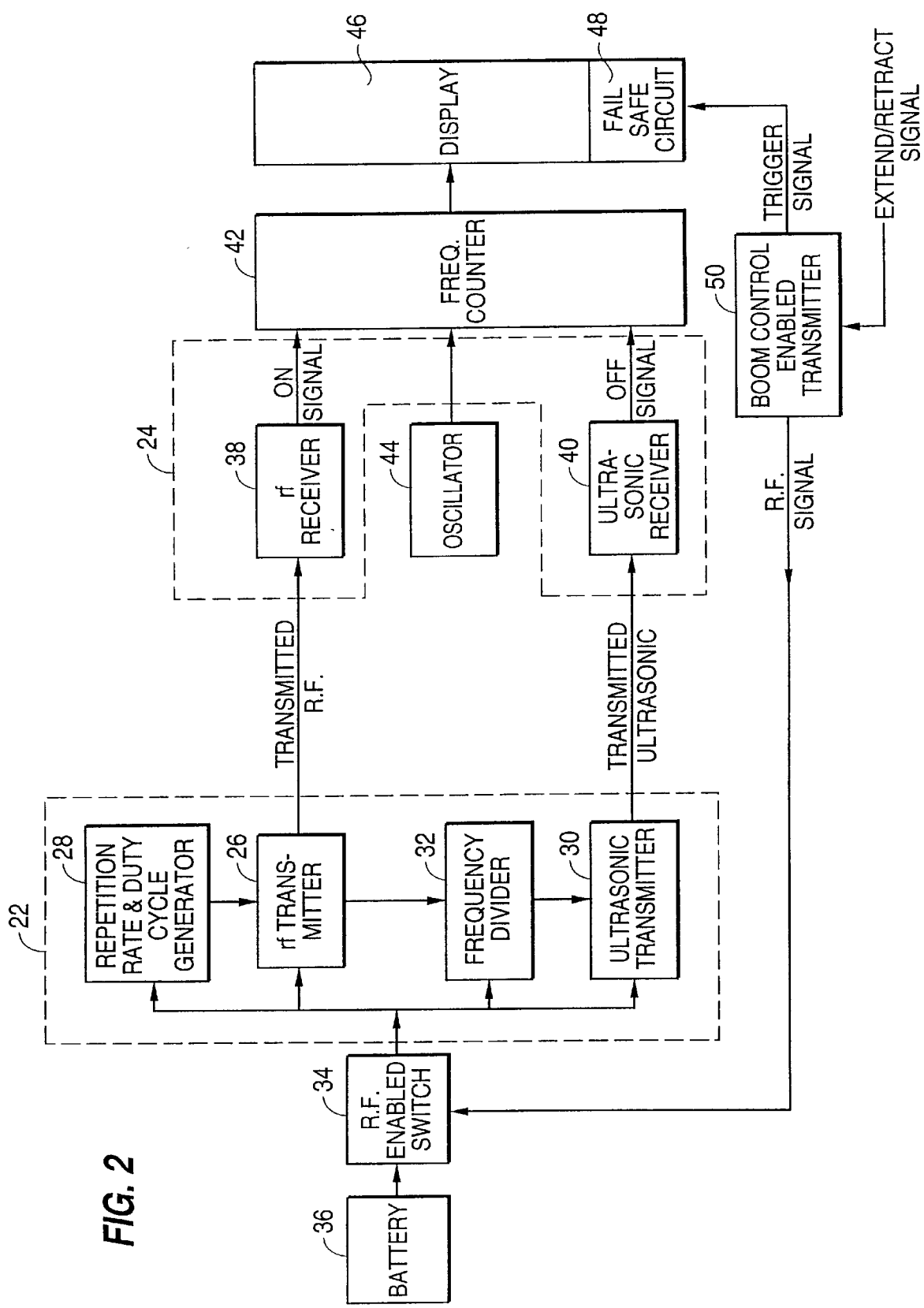
FIG. 2 illustrates an embodiment of the boom length measurement apparatus according to the present invention.

FIG. 2 illustrates the embodiment of the boom length measurement apparatus according to the present invention. As shown, the transmitting unit 22 includes a radio frequency (rf) transmitter 26 driven by a repetition rate and duty cycle generator 28 (hereinafter "generator 28") and an ultrasonic transmitter 30 driven by a frequency divider 32. The frequency divider 32 drives the ultrasonic transmitter 30 based on the rf signal transmitted by the rf transmitter 26. The rf enabled switch 34 selectively supplies power generated by the battery 36 to the transmitting unit 22.

The receiving unit 24 includes an rf receiver 38 and an ultrasonic receiver 40. A frequency counter 42, which counts at a rate established by an oscillator 44, receives output from the rf receiver 38 and the ultrasonic receiver 40, and generates a boom length measurement based on the difference in time of occurrence of these outputs. A display 46 displays the boom length measurement. The display 46 includes a fail safe circuit 48 connected to the boom control enabled transmitter 50. Besides controlling the operation of the rf enabled switch 34, the boom control enabled transmitter 50 triggers operation of the failsafe circuit 48.

The operation of the boom length measurement apparatus according to the present invention will be described with reference to FIG. 2. In the well known manner, the generator 28 generates an on/off signal to control transmission of an rf signal by the rf transmitter 26 when power is received from the battery 36 via the rf enabled switch 34. Also, when power is received from the battery 36 via the rf enabled switch 34, the frequency divider 32 frequency divides the rf signal to the ultrasonic range, amplifies the ultrasonic signal, and drives the ultrasonic transmitter 30 to transmit the ultrasonic signal.

The transmitting unit is small in size, employing a small antenna (about six inches) for rf signal transmission and a small transducer (about 1.5 inches in diameter) for ultrasonic signal transmission. Transmission of the rf signal requires only about a half watt of power, and transmission of the ultrasonic signal requires about five watts of power. The transmitting unit 22 only needs to be turned on during extension/retraction of the multi-section telescopic boom 10. Also, transmission time is short (about half a millisecond), and the repetition rate is low (about 10 times a second). Consequently, the duty cycle and power consumption of the transmitting unit 22 are low, and a small battery 36 can be used as a power source. Using the battery 36 eliminates cabling along the multi-section telescopic boom 10 for supplying power to the transmitting unit 22.

Battery life is extended by coupling the power output of the battery 36 to the transmitting unit 22 using an rf enabled switch 34. A boom control enabled transmitter 50 receives a signal indicating an operator's desire to extend or retract the multi-section telescopic boom 10. For the duration of this signal the boom control enabled transmitter 50 transmits an rf enable signal to the rf enabled switch 34. Also, upon receipt of the signal, the boom control enabled transmitter 50 triggers the fail safe circuit 48. When the rf enabled switch 34 receives the rf enable signal, the rf enabled switch 34 connects the battery 36 with the transmitting unit 22.

Both the rf signal and the ultrasonic signal are transmitted at substantially the same time. But, because rf signals travel at the speed of light (about 984 million feet per second) and ultrasonic signals travel at the speed of sound (about 1087 feet per second), the rf receiver 38 receives the rf signal prior to the receipt of the ultrasonic signal by the ultrasonic receiver 40. When the rf receiver 38 receives the rf signal, the rf receiver 38 outputs a reset signal to the frequency counter 42. Based on the reset signal, the frequency counter 42 resets a count value to zero, and begins counting at the rate established by the oscillator 44.

When the ultrasonic receiver 40 receives the ultrasonic signal, the ultrasonic receiver 40 outputs a stop count signal to the frequency counter 42. Based on the stop count signal, the frequency counter 42 stops counting. By setting the frequency of the oscillator 44, the counting rate of the frequency counter 42 can be established such that the count value directly represents the length of the multi-section telescopic boom 10. Otherwise, the frequency counter 42 converts the count value into a length measurement based on a predetermined relationship. The boom length measurement output by the frequency counter 42 is received by the display 46, and displayed to an operator.

The fail safe circuit 48, when triggered by the boom control enabled transmitter 50 as discussed above, determines whether the boom length measurement output by the frequency counter 42 is changing. Because the boom length should change if the boom control enabled transmitter 50 receives a signal indicating an operators desire to extend or retract the multi-section telescopic boom 10, if the fail safe circuit 48 does not determine a change in the boom length measurement, the fail safe circuit 48 outputs a warning to the operator.

Figure 3:
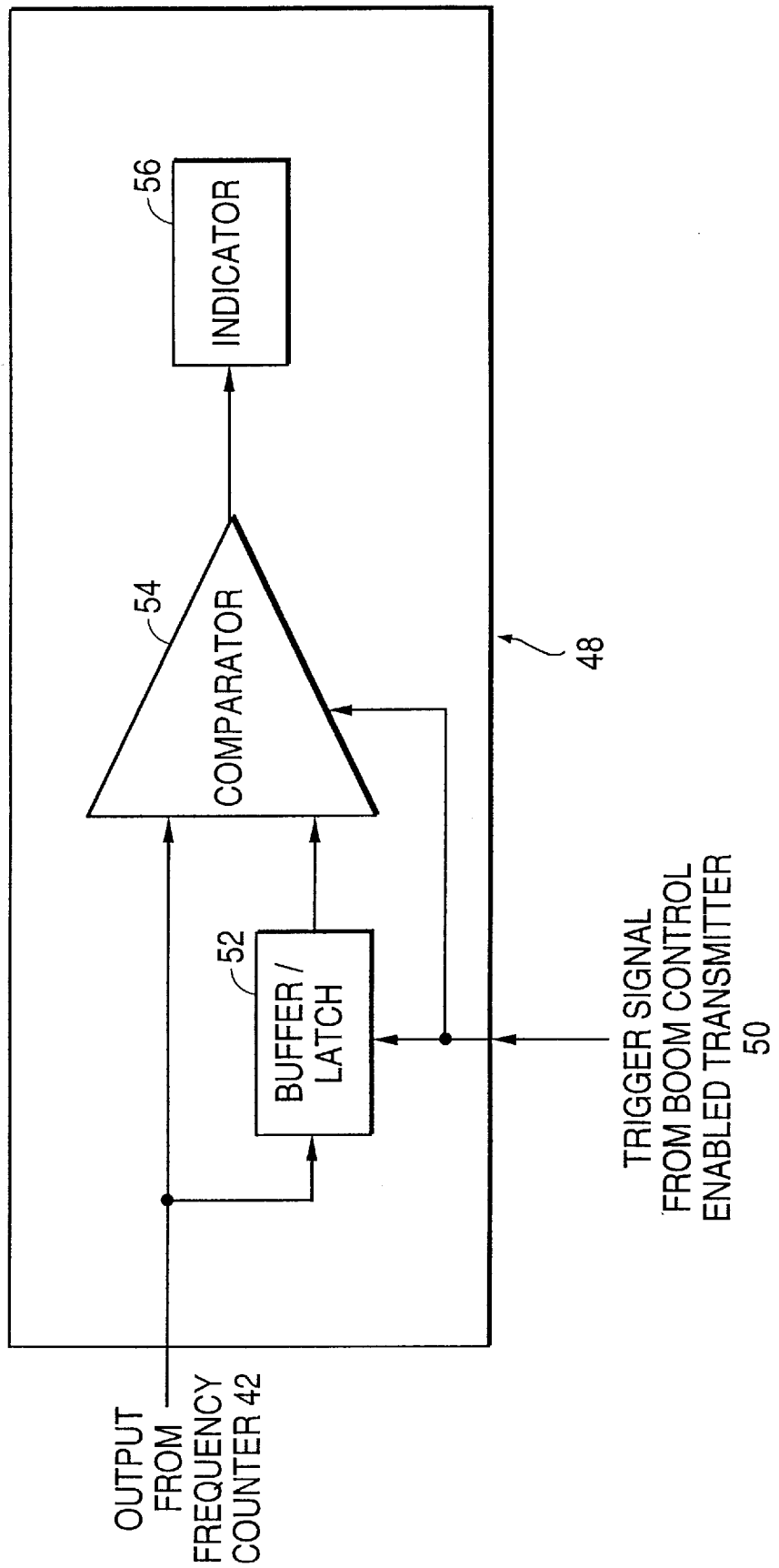
FIG. 3 illustrates the fail safe circuit of the boom length measurement apparatus according to the present invention in greater detail.

FIG. 3 illustrates the fail safe circuit 48 in detail. As shown, the fail safe circuit 48 includes a buffer/latch 52 storing the boom length measurement for a predetermined period of time, and a comparator 54 comparing the boom length measurement and a previous boom length measurement stored in the buffer/latch 52. If the boom length measurement and the previous boom length measurement match, the comparator 54 drives an indicator 56 to warn the operator.

Both the buffer/latch 52 and the comparator 54 operate in response to the trigger signal from the boom control enabled transmitter 50. As an alternative, the boom control enabled transmitter 50 can output a trigger signal for the entire duration of a telescoping operation by the multi-section telescopic boom 10, and the fail safe circuit 48 can repeatedly operate to determine whether the length measurement is changing. For instance, in this alternative embodiment, the trigger signal controls the generation of a clock signal by a clock signal generator, and the buffer/latch 52 and the comparator 54 are operationally triggered by the clock signal.

As evident from the above description, the boom length measurement apparatus according to the present invention eliminates the costly and cumbersome potentiometer or rotary sensor based structures of conventional boom length measuring systems.

While the transmitting unit 22 is powered by the battery 36, the receiving unit 24, the frequency counter 42, the display 46 (including fail safe circuit 48), and the boom control enabled transmitter 50 are continuously powered by the power source for the device of which the multi-section telescopic boom 10 forms a part. Accordingly, the boom length measurement is not lost when the device is not in operation.

Furthermore, while the transmitting unit 22 and receiving unit 24 have been described as a single unit with dual transmitters and receivers, separate transmitting and receiving units could be provided for each transmitter and receiver, respectively.

The invention being thus described, it will be obvious that the same may be varied in many ways. Such variations are not to be regarded as a departure from the spirit and scope of the invention, and all such are intended to be included within the scope of the following claims.

What is claimed is:

1. A boom length measurement apparatus, comprising:
   a transmitting unit, mounted on an extendable section of a multi-section telescopic boom, transmitting a first signal having a first transmission speed and a second signal having a second transmission speed, said second transmission speed being less than said first transmission speed;
   a receiving unit, mounted to a fixed support, receiving said first and second signals; and
   a length determiner determining a length of time between receipt of said first and second signals by said receiving unit, and determining a length of said multi-section telescopic boom based on said length of time.

2. The apparatus of claim 1, wherein said extendable section of said multi-section telescopic boom is a fly section.

3. The apparatus of claim 1, wherein said transmitting unit includes a first transmitter transmitting said first signal, and a second transmitter transmitting said second signal.

4. The apparatus of claim 1 wherein said first signal is a radio frequency signal, and said second signal is an ultrasonic frequency signal.

5. The apparatus of claim 1, wherein said receiving unit includes a first receiver receiving said first signal and a second receiver receiving said second signal.

6. The apparatus of claim 1, wherein said length determiner includes a counter, said counter resetting a count value upon receipt of said first signal, and increasing said count value at a predetermined rate until receipt of said second signal, said count value indicating said length of said multi-section telescopic boom.

7. The apparatus of claim 6, wherein said predetermined rate is set such that said count value is said length of said multi-section telescopic boom.

8. The apparatus of claim 1, further comprising:
   a power source;
   a switch selectively supplying power output by said power source to said transmitter in response to a power control signal; and a boom control enable transmitter receiving a boom control signal indicating that a user is one of extending and retracting said multi-section telescopic boom and transmitting said power control signal to said switch upon receipt of said boom control signal.

9. The apparatus of claim 1, further comprising:

a fail safe circuit receiving a boom control signal indicating that a user is one of extending and retracting said multi-section telescopic boom, determining if said length of said multi-section telescopic boom output by said length determiner changes upon receipt of said boom control signal, and outputting a warning to said user if said length output by said length determiner does not change.

10. The apparatus of claim 1, further comprising:

a display displaying said length output by said length determiner.

11. The apparatus of claim 1, wherein said receiving unit is mount to a base section of said multi-section telescopic boom.

12. The method of claim 1, further comprising:

selectively supplying power output by a power source to said transmitter using a switch in response to a power control signal; and receiving a boom control signal indicating that a user is one of extending and retracting said multi-section telescopic boom; and transmitting said power control signal to said switch upon receipt of said boom control signal.

13. The method of claim 1, further comprising:

receiving a boom control signal indicating that a user is one of extending and retracting said multi-section telescopic boom;

second determining if said length of said multi-section telescopic boom output by said first determining step changes upon receipt of said boom control signal; and outputting a warning to said user if said length output by said second determining step does not change.

14. The method of claim 1, further comprising:

displaying said length output by said first determining step.

15. A method of measuring a boom length, comprising:

transmitting a first signal having a first transmission speed using a transmitting unit mounted to an extendable section of a multi-section telescopic boom;

transmitting a second signal having a second transmission speed using said transmitting unit, said second transmission speed being less than said first transmission speed;

receiving said first and second signals using a receiving unit mounted to a fixed support; and first determining a length of said multi-section telescopic boom based on a length of time between receipt of said first and second signals by said receiving unit.

16. The method of claim 15, wherein said extendable section of said multi-section telescopic boom is a fly section.

17. The method of claim 15, wherein said first signal is a radio frequency signal, and said second signal is an ultrasonic frequency signal.

18. The method of claim 15, wherein said determining step comprises:

resetting a count value upon receipt of said first signal;

increasing said count value at a predetermined rate until receipt of said second signal, said count value indicating said length of said multi-section telescopic boom.

19. The method of claim 18, wherein said predetermined rate is set such that said count value is said length of said multi-section telescopic boom.

* * * * *